(12) United States Patent
Sakamoto et al.

(10) Patent No.: US 6,362,255 B2
(45) Date of Patent: Mar. 26, 2002

(54) CATIONIC ELECTRODEPOSITION COATING COMPOSITION

(75) Inventors: Hiroyuki Sakamoto, Kobe; Takayuki Kokubun, Suita; Kenichi Yoshizawa, Takahama; Toshitaka Kawanami, Hyogo; Yoshiaki Okumura, Joyo; Ichiro Kawakami, Takatsuki, all of (JP)

(73) Assignee: Nippon Paint Co., Ltd., Osaka (JP)

( * ) Notice: Subject to any disclaimer, the term of this patent is extended or adjusted under 35 U.S.C. 154(b) by 0 days.

(21) Appl. No.: 09/784,342

(22) Filed: Feb. 16, 2001

(30) Foreign Application Priority Data

Feb. 16, 2000 (JP) ............................. 12-038647

(51) Int. Cl.$^7$ ............................. C08K 3/20; C08L 63/02
(52) U.S. Cl. ..................... 523/457; 204/502; 204/504; 204/505; 204/506; 523/402; 523/404; 523/428
(58) Field of Search ................... 523/402, 403, 523/404, 423, 428, 457; 204/502, 504, 505, 506

(56) References Cited

U.S. PATENT DOCUMENTS 6,106,684 A * 8/2000 Kawakami ................. 204/504

FOREIGN PATENT DOCUMENTS

| EP | 0 696 624 A2 | 2/1996 |
|----|--------------|--------|
| EP | 0 974 623 A2 | 1/2000 |
| EP | 0 974 624 A2 | 1/2000 |
| EP | 0 974 625 A2 | 1/2000 |

* cited by examiner

Primary Examiner—Robert Dawson
Assistant Examiner—D. Aylward
(74) Attorney, Agent, or Firm—Connolly Bove Lodge & Hutz

(57) ABSTRACT

It is an object of the present invention to provide a cationic electrodeposition coating composition which is free of toxic rust-preventive pigments such as lead compounds and capable of giving coating films having high resistance to corrosion and rusting, even when applied to a substrate surface which is only insufficiently subjected, to a chemical conversion treatment. The present invention provides a cationic electrodeposition coating composition which comprises a rust inhibitor comprising at least one compound selected from the group consisting of compounds containing any of elemental metals belonging to the period 4, 5 or 6 of group 3 of the periodic table and a sulfonium- and propargyl group-containing resin composition. For, example, the content of said rust inhibitor is 0.03 to 10 weight parts in terms of the elemental metal in the rust inhibitor based on 100 weight parts of the solid resins in the resin composition.

12 Claims, No Drawings

CATIONIC ELECTRODEPOSITION COATING COMPOSITION

FIELD OF THE INVENTION

The present invention relates to a cationic electrodeposition coating composition and more particularly to a lead-free cationic electrodeposition coating composition which can be applied to a substrate which has not been subjected to a chemical conversion treatment or any local area of a substrate that has not been sufficiently so pretreated to impart a high resistance to corrosion and rusting.

PRIOR ART

Electrodeposition coating compositions are excellent in rust preventing effect, corrosion resistance and throwing power and can form uniform coatings and, therefore, are widely used on metallic shaped articles, especially as primers for automotive bodies and parts. From the standpoint of corrosion resistance and rust prevention, in particular, cationic electrodeposition coating compositions have now been in use almost universally.

In cationic electrodeposition coating compositions, rust inhibitor pigments, such as lead compounds, for example basic lead silicate, have been used to attain high corrosion and rusting resistance. In recent years, however, the use of lead compounds has been restricted because of their toxicity which causes an environmental pollution problem, among others.

As rust inhibitor pigments other than lead compounds, such pigments as phosphate, molybdate and borate pigments, among others, have heretofore been evaluated. These, however, have a drawback; they are inferior in rust preventing effect when compared with lead compounds. As for other proposals, Japanese Kokai Publication Hei-02-279773 discloses the use of iron oxide, Japanese Kokai Publication Hei-04-325572 discloses the use of copper, nickel, zinc, cobalt, chromium, aluminum, manganese, zirconium, tin or iron, Japanese Kokai Publication Hei-05-140487 discloses the use of bismuth hydroxide/tin, cerium hydroxide/tin or nickel hydroxide/tin, Japanese Kokai Publication Hei-05-239386 discloses the use of lantanum compounds, Japanese Kokai Publication Hei-05-247385 discloses the use of bismuth compounds/tin and, further, Japanese Kokai Publication Hei-06-220371 discloses the use of tungsten compounds. In all these cases, however, the anticorrosive and rust-preventing effects have been found inadequate.

Moreover in order to achieve high corrosion resistance and rust inhibition by the application of a cationic electrodeposition coating, the metal substrate must be subjected to a chemical conversion treatment, using zinc phosphate, for instance, in advance. However, when the metal substrate has a "bag"-like recessed structure, an effective chemical conversion film may not be formed in the recessed area so that no sufficient corrosion resistance or rust inhibition is obtained at times.

SUMMARY OF THE INVENTION

It is an object of the present invention to provide a cationic electrodeposition coating composition which is free of toxic rust-preventive pigments such as lead compounds and capable of giving coating films having high resistance to corrosion and rusting, even when applied to a substrate surface which has not been subjected, or only insufficiently subjected, to a chemical conversion treatment.

The present invention provides a cationic electrodeposition coating composition which comprises a rust inhibitor comprising at least one compound selected from the group consisting of compounds containing any of elemental metals belonging to the period 4, 5 or 6 of group 3 of the periodic table and a sulfonium- and propargyl group-containing resin composition.

It is preferred that the content of said rust inhibitor is 0.03 to 10 weight parts in terms of the elemental metal in the rust inhibitor based on 100 weight parts of the solid resins in the resin composition.

It is also preferred that the resin composition has a sulfonium group content of 5 to 400 millimoles and a propargyl group content of 10 to 495 millimoles per 100 grams of the solid resins in the resin composition, and the sum total of the sulfonium and propargyl group-contents is not more than 500 millimoles per 100 grams of the solid resins in the resin composition, and still more preferred that the resin composition has a sulfonium group content of 5 to 250 millimoles and a propargyl group content of 20 to 395 millimoles per 100 grams of the solid resins in the resin composition, and the sum total of the sulfonium and propargyl group contents is not more than 400 millimoles per 100 grams of the solid resins in the resin composition.

The resin composition comprises an epoxy resin as a skeleton thereof and said epoxy resin is preferably a novolak cresol type epoxy resin or novolak phenol type epoxy resin and has a number average molecular weight of 700 to 5,000.

DETAILED DESCRIPTION OF THE INVENTION

The cationic electrodeposition coating composition of the present invention contains a rust inhibitor comprising at least one compound selected from the group consisting of compounds containing any of elemental metals belonging to the period 4, 5 or 6 of group 3 of the periodic table and a sulfonium- and propargyl group-containing resin composition.

The rust inhibitor in the cationic electrodeposition coating composition is at least one compound selected from the group consisting of compounds containing any of the elemental metals belonging to the period 4, 5 or 6 of group 3 of the periodic table. As specific examples of such elemental metals, there can be mentioned scandium, yttrium and lanthanoid elements. Promethium, however, is a radioactive element and can hardly be obtained from commercial sources. Therefore, this element is unsuited for all practical purposes.

As examples of the compounds containing such elements, there can be mentioned organic or inorganic compounds containing, as one constituent, an yttrium compound, a cerium compound, a praseodymium compound, a neodymium compound, samarium compound, europium compound, gadolinium compound, terbium compound, dysprosium compound, holmium compound, erbium compound, thulium compound, ytterbium compound or lutetium compound. More specifically, there can be mentioned salts with organic acids, such as yttrium formate, cerium acetate, neodymium acetate, europium acetate, terbium acetate, holmium acetate, erbium acetate, ytterbium acetate, samarium lactate, neodymium lactate, cerium lactate, samarium oxalate, etc. and salts with inorganic acids or inorganic compounds, such as yttrium nitrate, yttrium tungstate, praseodymium molybdate, yttrium amido sulfate, neodymium amidosulfate, samarium amidosulfate, neodymium oxide, samarium hydroxide and so on.

The rust inhibitor mentioned above may be water-soluble or more or less water-insoluble but one having a solubility of not less than 1 g/dm$^3$ in water is preferred because a high degree of corrosion resistance can be attained at a low concentration. As such rust inhibitors, among the compounds mentioned above, there can be mentioned cerium acetate, neodymium acetate, yttrium amidosulfate, neodymium amidosulfate and samarium amidosulfate.

The content of the above rust inhibitor in the cationic electrodeposition coating composition of the present invention is preferably 0.03 to 10 weight parts, more preferably 0.05 to 8 weight parts, in terms of the elemental metal in the rust inhibitor based on 100 weight parts of the solid resins in the resin composition. When the content of said rust inhibitor is less than 0.03 weight parts in terms of the elemental metal in the rust inhibitor, the coatings obtained will be insufficient in corrosion resistance and rust preventing effect. When it is in excess of 10 weight parts, the physical properties of the coating films obtained will possibly be reduced.

The resin composition in the cationic electrodeposition coating composition of the present invention contains a sulfonium group and a propargyl group. The term "resin composition" as used herein means a composition comprised exclusively of a resin having both sulfonium and propargyl groups per molecule or a composition containing both a sulfonium group-containing resin and a propargyl group-containing resin. In the latter case, the resin composition as a whole has the two kinds of curing functional groups. Thus, the resin composition may be a sulfonium- and propargyl group-containing resin or a mixture of a sulfonium group-containing resin and a propargyl group-containing resin, or a mixture of all of these. The resin composition in the cationic electrodeposition coating composition of the present invention has sulfonium and propargyl groups in the above sense.

The sulfonium group mentioned above is a hydratable functional group in the resin composition. When a voltage or current not lower than a certain level is applied in the process of electrodeposition coating, the sulfonium group is irreversibly converted to a passive state as the result of its electrolytic reduction on the electrode, hence loss of its ionicity. This is supposedly the reason why the cationic electrodeposition coating composition of the present invention can show high throwing power.

It is also presumable that, in this process of electrodeposition coating, an electrode reaction is induced to form a hydroxide ion and the sulfonium ion hold this hydroxide ion to form an electrolytically generated base in the electrodeposited coat.

The sulfonium group content in the above resin composition in the cationic electrodeposition coating composition of the present invention is 5 to 400 millimoles per 100 grams of the solid resins in said resin composition on condition that the requirement relative to the total content of sulfonium and propargyl groups, which is to be mentioned later herein, is satisfied. When it is less than 5 millimoles per 100 grams, no sufficient throwing power or curability cannot be attained and the hydratability and bath stability will be poor. If it is in excess of 400 millimoles per 100 grams, the coating deposition on the substrate surface becomes poor. Said sulfonium group content can be selected within a more preferred range, which depends on the resin skeleton employed. In the case of novolak phenol type epoxy resins and novolak cresol type epoxy resins, for instance, it is preferably within the range of 5 to 250, most preferably 10 to 150 millimoles, per 100 grams of the solid resins in the resin composition.

The propargyl group in the resin composition of the cationic electrodeposition coating composition of the present invention is improved in reactivity upon conversion to an allene bond by an electrolytically generated base in the electrodeposited coating, and thus can constitute a curing system of the cationic electrodeposition coating composition of the present invention. Furthermore, for unknown reasons, the throwing power of the cationic electrodeposition coating composition can be further improved when the propargyl group coexists with the sulfonium group.

The propargyl group content in the resin composition contained of the cationic electrodeposition coating composition of the present invention is 10 to 495 millimoles per 100 grams of the solid resins in said resin composition on condition that the requirement relative to the total content of sulfonium and propargyl groups, which is to be mentioned later herein, is satisfied. If it is less than 10 millimoles per 100 grams, sufficient throwing power or curability cannot be obtained. If it is in excess of 495millimoles per 100 grams, the hydration stability of the cationic electrodeposition coating composition in which said resin composition is used may adversely be affected. Said propargyl group content can be selected within a more preferred range, which depends on the resin skeleton employed. In the case of novolak phenol type epoxy resins and novolak cresol type epoxy resins, for instance, it is preferably within the range of 20 to 395 millimoles per 100 grams of the solid resins in the resin composition.

The resin, which constitute the skeleton of the resin composition in the cationic electrodeposition coating composition of the present invention, is not particularly restricted but is preferably an epoxy resin. Suited for use as the epoxy resin are those having at least two epoxy groups per molecule, more specifically epibisepoxy resins, derivatives thereof as obtained by chain extension with a diol, a dicarboxylic acid, a diamine or the like; epoxidized polybutadiene; novolak phenol type polyepoxy resins; novolak cresol type polyepoxy resins; polyglycidyl acrylate; aliphatic polyol or polyether polyol polyglycidyl ethers; polybasic carboxylic acid polyglycidyl esters; and like polyepoxy resins. Among them, novolak phenol type polyepoxy resins, novolak cresol type polyepoxy resins and polyglycidyl acrylate are preferred because they can easily be polyfunctionalized for curability improvement. Said epoxy resin may partly comprise a monoepoxy resin.

The resin composition in the cationic electrodeposition coating composition of the present invention comprises a resin the skeleton of which is the above epoxy resin. It has a number average molecular weight of 500 to 20,000. When the number average molecular weight is below 500, the coating efficiency of the cationic electrodeposition coating is poor. If it is above 20,000, no good coat can be formed on the surface of a substrate to be coated. Said number average molecular weight can be selected within a more preferred range, which depends on the resin skeleton. In the case of novolak phenol type epoxy resins and novolak cresol type epoxy resins, for instance, it is preferably within the range of 700 to 5,000.

The total content of the sulfonium and propargyl groups in the above resin composition is not more than 500 millimoles per 100 grams of the solid resins in the resin composition. If it is in excess of 500 millimoles per 100 grams, no resin may be obtained in practice or the desired performance characteristics may not be obtained in certain instances. Said total content of sulfonium and propargyl groups in the resin composition mentioned above can be selected within a more preferred range, which depends on the resin skeleton employed. In the case of novolak phenol type epoxy resins and novolak cresol type epoxy resins, for instance, it is preferably within the range of not more than 400 millimoles.

The propargyl groups in the resin composition in the cationic electrodeposition coating composition of the present invention may partly be in an acetylide form. The acetylide is a salt-like metal compound with acetylene. The content of those propargyl groups occurring in the form of acetylide in the above resin composition is preferably 0.1 to 40 millimoles per 100 grams of the solid resins in the resin composition. When it is less than 0.1 millimole, the effect of the acetylide form cannot be fully produced, while it is difficult to attain an acetylide content exceeding 40 millimoles. Said content can be selected within a more preferred range which depends on the metal employed.

In the case that some of propagyl groups are converted to an acetylide-form, the metal in the acetylide-form propargyl group is not particularly restricted but may be any metal showing catalytic activity. As examples, there may be mentioned transition metals such as copper, silver and barium and some of the elemental metals belonging to the period 4, 5 or 6 of group 3 of the periodic table. Among them, copper, silver and cerium are preferred because of their environmental friendliness and copper and cerium are more preferred in view of its readily availability. Where copper or cerium is used for converting the propargyl group to an acetylide form, the content of the propargyl group in acetylide form is more preferably 0.1 to 20 millimoles per 100 grams of the solid resins in the resin composition.

By converting some of the propargyl groups in the resin composition in the cationic electrodeposition coating composition of the present invention to an acetylide form, it is possible to introduce a curing catalyst into the resin. By doing so, it becomes generally unnecessary to directly add, to the coatings, an organic transition metal complex, hardly soluble or dispersible in organicsolventsorwater. Since even a transition metal can easily be introduced, in an acetylide form, into the resin, the transition metal can be freely used in the coating composition even when the corresponding transition metal compound is a hardly soluble one. Furthermore, the occurrence of an organic acid anion in the electrodeposition bath, as is found when a transition metal organic acid salt is used, can be avoided and, in addition, the problem that the metal ion is removedupon ultrafiltration is no more caused. The bath control and cationic electrodeposition coating composition designing become easy.

The resin composition in the cationic electrodeposition coating composition of the present invention may contain a carbon-carbon double bond, if desirable. The carbon-carbon double bond is highly reactive and, therefore, can further improve the curability.

The content of said carbon-carbon double bond is preferably 10 to 485 millimoles per 100 grams of the solid resins in the resin composition on condition that the requirement relative to the propargyl group and carbon-carbon double bond content, which is to be mentioned later herein, is satisfied. If it is less than 10 millimoles per 100 grams, said bond cannot contribute toward attaining sufficient curability. When it is in excess of 485 millimoles per 100 grams, the stability of the hydrated form when said resin composition is used in a cationic electrodeposition coating composition may possibly be adversely affected. Said carbon-carbon double bond content can be selected within a more preferred range depending on the resin skeleton employed. In the case of novolak phenol type epoxy reins and novolak cresol type epoxy resins, for instanqe, said content is preferably 20 to 375 millimoles per 100 grams of the solid resins in the resin composition.

In cases where the resin composition contains the above carbon-carbon double bond, the total content of the above propargyl group and carbon-carbon double bond is preferably within the range of 80 to 450 millimoles per 100 grams of the solid resins in the resin composition. When it is less than 80 millimoles, the curability may possibly be insufficient. If it exceeds 450 millimoles, the sulfonium group content must be reduced and, as a result, the throwing power may possibly become insufficient. The total content of the propargyl group and carbon-carbon double bond can be selected within a more preferred range depending on the resin skeleton employed. In the case of novolak phenol type epoxy resins and novolak cresol type epoxy resins, for instance, said total content is preferably 100 to 395 millimoles.

Furthermore, in cases where the resin composition contains the above carbon-carbon double bond, the total content of the above sulfonium group, propargyl group and carbon-carbon double bond is preferably not more than 500 millimoles per 100 grams of the solid resins in the resin composition. If it exceeds 500 millimoles, no resin may be obtained in practice or the desired performance characteristics may not be obtained in certain instances. Said total content of sulfonium group, propargyl group and carbon-carbon double bond can be selected within a more preferred range depending on the resin skeleton employed. In the case of novolak phenol type epoxy resins and novolak cresol type epoxy resins, for instance, said total content is preferably not more than 400 millimoles.

The resin composition to be contained in the cationic electrodeposition coating composition of the present invention can judiciously be produced, for example, by the step (i) of reacting an epoxy resin having at least two epoxy groups per molecule with a compound having a propargyl group and a functional group capable of reacting with the epoxy group, to give a propargyl group-containing epoxy resin composition and the step (ii) of reacting the.remaining epoxy group (s) in the propargyl group-containing epoxy resin composition obtained in step (i) with a sulfide/acid mixture to thereby introduce a sulfonium group or groups into said resin composition.

Said compound having a propargyl group and a functional group capable of reacting with the epoxy group (hereinafter such compound is referred to as "compound (A)") may have a propargyl group and a hydroxy or carboxyl group or like functional group capable of reacting with the epoxy group, and specifically includes propargyl alcohol, propargylic acid and the like. Among them, propargyl alcohol is preferred because of its ready availability and ease of reaction.

In cases where the resin composition to be contained in the cationic electrodeposition coating composition of the present invention has a carbon-carbon double bond as necessary, a compound having a carbon-carbon double bond and a functional group capable of reacting with the epoxy group (hereinafter such compound is referred to as "compound (B)") is used in combination with the above-mentioned compound (A) in the above step (i). Said compound (B) may have, for example, a carbon-carbon double bond and a hydroxy or carboxyl group or like functional group capable of reacting with the epoxy group. Specifically, when the functional group capable of reacting with the epoxy group is a hydroxy group, there may be mentioned 2-hydroxyethyl acrylate, 2-hydroxyethyl methacrylate, hydroxypropyl acrylate, hydroxypropyl methacryalte, hdyroxybutyl acrylate, hydroxybutyl methacryalte, allyl alcohol, methallyl alcohol and the like. When the functional group capable of reacting with the epoxy group is a carboxyl group, mention may be made of acrylic acid, methacrylic acid, ethacrylic acid, crotonic acid, maleic acid, phthalic acid, itaconic acid; half esters such as maleic acid ethyl ester, fumaric acid ethyl ester, itaconic acid ethyl ester, succinic acid mono(meth)acryloyloxyethyl ester and phthalic acid mono(meth)acryloyloxyethyl ester; synthetic unsaturated fatty acids such as oleic acid, linolic acid and ricinolic acid; and natural unsaturated fatty acids such as linseed oil and soybean oil, among others.

In the above step (i), said epoxy resin having at least two epoxy groups per molecule is reacted with said compound (A) to give a propargyl group-containing epoxy resin composition, or said epoxy resin is reacted with said compound (A) together with said compound (B), as necessary, to give a propargyl- and carbon-carbon double bond-containing epoxy resin composition. In the latter case, said compound (A) and compound (B) may be admixed beforehand and submitted to reaction in step (i) or said compound (A) and compound (B) may be separatedly submitted to reaction in said step. That functional group capable of reacting with the epoxy group which the compound (A) has may be the same as or different from that functional group capable of reacting with the epoxy group which the compound (B) has.

In the above step (i), the proportions of compound (A) and compound (B), both to be submitted to reaction, may be selected so that the desired functional group contents, for instance the propargyl group and carbon-carbon double bond contents specifically mentioned hereinabove, may be obtained.

The reaction in the above step (i) is generally carried out at room temperature or 80 to 140° C. for several hours. If necessary, a known component or components required for the reaction to proceed, for example a catalyst and/or a solvent, may be used. The completion of the reaction can be checked by measuring the epoxy equivalent, and the functional group(s) introduced can be confirmed by subjecting the resin composition obtained to nonvolatile matter measurement and/or instrumental analysis. Generally, the thus-obtained reaction product is a mixture of epoxy resins having one or a plurality of propargyl groups or a mixture of epoxy resins having a propargyl group or groups and one or a plurality of carbon-carbon double bonds. In this sense, the above step (i) gives a propargyl group-containing, or propargyl- and carbon-carbon double bond-containing resin composition.

In the above step (ii), the remaining epoxy groups in the propargyl group-containing epoxy resin composition obtained in the above step (i) is reacted with a sulfide/acid mixture for the introduction of a sulfonium group. The sulfonium group introduction is carried out, for instance, by the method comprising reacting the sulfide/acid mixture with the epqxy group for sulfide introduction and conversion to sulfonium or by the method comprising effecting sulfide introduction and further converting the sulfide introduced to a sulfonium using an acid or an alkyl halide, such as methyl fluoride, methyl chloride and methyl bromide, followed by anion exchange when necessary. From the viewpoint of ready availability of raw materials, the method which uses a sulfide/acid mixture is preferred.

The sulfide mentioned above is not particularly restricted but includes, among others, aliphatic sulfides, aliphatic-aromatic mixed sulfides, aralkyl sulfides and cyclic sulfides. More specifically, there may be mentioned diethyl sulfide, dipropyl sulfide, dibutyl sulfide, dihexyl sulfide, diphenyl sulfide, ethyl phenyl sulfide, tetramethylene sulfide, pentamethylene sulfide, thiodiethanol, thiodipropanol, thiodibutanol, 1-(2-hydroxyethylthio)-2-propanol, 1-(2-hydroxyethylthio)-2-butanol, 1-(2-hydroxyethylthio)-3-butoxy-1-propanol and the like.

The acid mentioned above is not particularly restricted but includes, among others, formic acid, acetic acid, lactic acid, propionic acid, boric acid, butyric acid, dimethylolpropionic acid, hydrochloric acid, sulfuric acid, phosphoric acid, N-acetylglycine, N-acetyl-β-alanine and the like.

Generally, the mixing ratio between said sulfide and said acid in the sulfide/acid mixture (sulfide/acid) is preferably about 100/60 to 100/100 by mole.

The reaction in the above step (ii) can be carried out, for example, by mixing the propargyl group-containing epoxy resin composition obtained in the step (i) and a mixture of predetermined amounts of said sulfide and said acid sufficient to give the sulfonium group content mentioned above, for instance, with water in an amount 5 to 10 moles per mole of the sulfide used and then stirring generally at 50 to 90° C. for several hours. The end point of the reaction can be estimated by the fact that the residual acid value becomes 5 or less. The sulfonium group introduction into the resin composition obtained can be confirmed by potentiometric titration. In cases where sulfide introduction is followed by conversion to sulfonium, the process can be carried out in the same manner as mentioned above. By effecting sulfonium introduction after propargyl group introduction, as mentioned above, the sulfonium group can be prevented from being decomposed upon heating.

In cases where the propargyl groups possessed by the resin composition to be contained in the cationic electrodeposition coating composition of the invention are partly converted to an acetylide form, the step of acetylidization may comprise reacting the propargyl group-containing epoxy resin composition obtained in the above step (i) with a metal compound to thereby convert some of the propargyl groups in said epoxy resin composition to the corresponding acetylide form. Said metal compound is preferably a transition metal compound capable of acetylide formation and includes, among others, complexes and salts of transition metals such as copper, silver and barium. More specifically, there may be mentioned copper acetylacetonate, copper acetate, silver acetylacetonate, silver acetate, silver nitrate, barium acetylacetonate, barium acetate and the like. Among them, copper and silver compounds are preferred from the viewpoint of environment-friendliness, and copper compounds are more preferred from the viewpoint of ready availability. Thus, for instance, copper acetylacetonate is suited for use in view of ease of bath control.

As for the reaction conditions, the conversion of some of the propargyl groups to an acetylide form is generally carried out at 40 to 70° C. for several hours. The progress of the reaction can be checked, for example, by coloration of the resin composition obtained or by nuclear magnetic resonance spectrometry, namely through disappearance of the methyne proton signal. The time point of the acetylide formation reaction at which conversion of a desired proportion of the propargyl groups to an acetylide form is attained is confirmed in that manner and, at that time point, the reaction is terminated. The reaction product obtained is generally a mixture of epoxy resins in which one or a plurality of propargyl groups are in an acetylide form. The thus-obtained epoxy resin composition having some of the propargyl groups in an acetylide form can be subjected to the above step (ii) for sulfonium introduction thereinto.

The step of converting some of the propargyl groups in the epoxy resin composition to an acetylide form and the above step (ii) can be carried out simultaneously since common reaction conditions can be selected for both steps. When both steps are carried out simultaneously, the production process can advantageously be simplified.

In this manner, a propargyl- and sulfonium group-containing and optionally carbon-carbon double bond-containing resin composition optionally having some of the propargyl groups in an acetylide form can be produced while preventing the sulfonium group(s) from being decomposed. Although acetylides, when in a dry state, have explosiveness, the acetylidization reaction in the practice of the present invention can be carried out in an aqueous medium to give the desired substance as an aqueous composition, so that no safety problems arise.

The cationic electrodeposition coating composition of the present invention contains the above resin composition. In the cationic electrodeposition coating composition of the present invention, the use of a curing agent is not always necessary, since said resin composition itself has curability. For further improving the curability, however, a curing agent may be used. As such a curing agent, there may be mentioned, among others, compounds obtained by reacting a compound having a plurality of propargyl groups and/or carbon-carbon double bonds, such as polyepoxides derived from novolak phenol or the like, or pentaerythritol tetraglycidiyl ether, with a propargyl group-containing compound, such as propargyl alcohol, and/or a carbon-carbon double bond-containing compound, such as acrylic acid in the manner of addition reaction.

In the cationic electrodeposition coating composition of the present invention, it is not always necessary to use a curing catalyst. In cases where it is necessary to further improve the curability depending on the curing reaction conditions, however, a transition metal compound or some other curing catalyst in general use may be added, when necessary, in an appropriate amount. Such compounds are not particularly restricted but include, among others, complexes or compounds resulting from binding of a ligand, such as cyclopentadiene and acetylacetone, or a carboxylic acid, such as acetic acid, to a transition metal, such as nickel, cobalt, manganese, palladium and rhodium. Said curing catalyst is used preferably in an amount of 0.1 to 20 millimoles per 100 grams of the solid resins in the cationic electrodeposition coating composition.

An amine may be incorporated in the cationic electrodeposition coating composition of the present invention. The incorporation of an amine results in an increased rate of conversion of the sulfonium group to a sulfide form as a result of electrolytic reduction in the electrodeposition process. Said amine is not particularly restricted but includes, among others, amine compounds, for example primary to tertiary, monofunctional or polyfunctional aliphatic amines, alicyclic amines and aromatic amines. Among them, water-soluble or water-dispersible ones are preferred and thus, for instance, mention maybe made of alkylamines containing 2 to 8 carbon atoms, such as monomethylamine, dimethylamine, trimethylamine, triethylamine, propylamine, diisopropylamine and tributylamine; monoethanolamine, diethanolamine, methylethanolamine, dimethylethanolamine, cyclohexylamine, morpholine, N-methylmorpholine, pyridine, pyrazine, piperidine, imidazoline, imidazole and the like. These may be used singly or two or more of them may be used combinedly. Amdng them, hydroxyamines, such as monoethanolamine, diethanolamine and dimethylethanolamine, are preferred owing to their affording stable aqueous dispersions.

Said amine can be directly incorporated into the cationic electrodeposition coating composition of the present invention. While, in the prior art cationic electrodeposition coating compositions of the neutralized amine type, the addition of a free amine results in deprivation of the neutralizing acid in the resin, leading to a marked decrease in stability of the electrodeposition solution, such bath stability impairment is never encountered in the practice of the present invention.

Said amine is added preferably in an amount of 0.3 to 25 meq (milliequivalents) per 100 grams of the solid resins in the cationic electrodeposition coating composition. When it is less than 0.3 meq/100 grams, the effect on the throwing power cannot be sufficient. At addition amounts above 25 meq/100 grams, any additional effect corresponding to the addition amount cannot be obtained and this is uneconomical. An addition amount of 1 to 15 meq/100 grams is more preferred.

It is also possible to incorporate an aliphatic hydrocarbon group-containing resin composition in the cationic electrodeposition coating composition of the present invention. By incorporating said aliphatic hydrocarbon group-containing resin composition, the coating films obtained are improved in shock resistance. As said aliphatic hydrocarbon group-containing resin composition, there may be mentioned those which contain 5 to 400 millimoles of a sulfonium group, 80 to 135 millimoles of an aliphatic hydrocarbon group containing 8 to 24 carbon atoms (and an optional unsaturated double bond in the chain thereof), and 10 to 315 millimoles of an unsaturated double bond-terminated organic group containing 3 to 7 carbon atoms and/or a propargyl group, per 100 grams of the solid resins in the resin composition and which has a total content of said sulfonium group, an aliphatic hydrocarbon group containing 8 to 24 carbon atoms (and an optional unsaturated double bond in the chain thereof) and unsaturated double bond-terminated organic group containing 3 to 7 carbon atoms and/or propargyl group of not more than 500 millimoles per 100 grams of the solid resins in the resin composition.

When such aliphatic hydrocarbon group-containing resin composition is incorporated in the above cationic electrodeposition coating composition, it is preferred that the sulfonium group content is 5 to 400 millimoles, the content of the aliphatic hydrocarbon group containing 8 to 24 carbon atoms (and an optional unsaturated double bond in the chain thereof) is 10 to 300 millimoles and the total content of the propargyl group and the unsaturated double bond-terminated organic group containing 3 to 7 carbon atoms is 10 to 485 millimoles, per 100 grams of the solid resins in the cationic electrodeposition coating composition, the total content of the sulfonium group, an aliphatic hydrocarbon group containing 8 to 24 carbon atoms (and an optional unsaturated double bond in the chain thereof), propargyl group and unsaturated double bond-terminated organic group containing 3 to 7 carbon atoms is not more than 500 millimoles per 100 grams of the solid resins in the cationic electrodeposition coating composition and the content of said aliphatic hydrocarbon group containing 8 to 24 carbon atoms (and an optional unsaturated double bond in the chain thereof) is 3 to 30% by weight relative to the solid resins in the cationic electrodeposition coating composition.

If, when an aliphatic hydrocarbon group-containing resin composition is incorporated in the above cationic electrodeposition coating composition, the sulfonium group content is less then 5 millimoles per 100 grams, sufficient throwing power and/or curability cannot be attained and the hydratability and bath stability tends to become worse. If said content exceeds 400 millimoles per 100 grams, the coating deposition on the substrate surface becomes poor. If the content of the aliphatic hydrocarbon groups containing 8 to 24 carbon atoms (and an optional unsaturated double bond in the chain thereof) is less than 80 millimoles per 100 grams, the shock resistance cannot be improved to a satisfactory extent. If it exceeds 350 millimoles per 100 grams, the resin composition becomes difficult to handle. If the total content of the propargyl group and unsaturated double bond-terminated organic group containing 3 to 7 carbon atoms is less than 10 millimoles per 100 grams, sufficient curability cannot be obtained even when another resin and/or a curing agent is used in combination. If it is above 315 millimoles per 100 grams, the shock resistance is improved only to an unsatisfactory extent. The total content of the sulfonium group, an aliphatic hydrocarbon group containing 8 to 24 carbon atoms (and an optional unsaturated double bond in the chain thereof), propargyl group and unsaturated double bond-terminated organic group containing 3 to 7 carbon atoms is not more than 500 millimoles per 100 grams of the solid resins in the resin composition. If it exceeds 500 millimoles, no resin may be obtained in practice or the desired performance characteristics may not be obtained in some instances.

The cationic electrodeposition coating composition of the present invention comprises said resin composition and said rust inhibitor. The method of mixing said resin composition with said rust inhibitor is not particularly restricted but may for example comprise dispersing said rust inhibitor in a pigment-dispersing resin to prepare a dispersion paste in the first place and mixing this paste with said resin composition. The above pigment-dispersing resin is employed for a dual purpose, namely dispersing said rust inhibitor uniformly in said resin composition and maintaining the resulting mixture stably dispersed in the resultant cationic electrodeposition coating composition. The pigment-dispersing resin is not particularly restricted but any of those pigment-dispersing resins in routine use for the purpose can be employed. Pigment-dispersing resins containing both a sulfonium group and an unsaturated bond per molecule can also be utilized. Such a pigment-dispersing resin containing both a sulfonium group and an unsaturated bond per molecule can be obtained by reacting a sulfide compound with a hydrophobic epoxy resin obtainable by the reaction of a bisphenol type epoxy resin with a half-blocked isocyanate or reacting a sulfide compound with said resin in the presence of a monobasic acid and a hydroxyl group-containing dibasic acid, among other methods.

The cationic electrodeposition coating composition of the present invention may contain a further component or components commonly used in cationic electrodeposition coating compositions in general, if necessary. Said further components are not particularly restricted but include, among others, such coating additives as color pigments, pigment-dispersing resins, surfactants, antioxidants and ultraviolet absorbers.

Said color pigments are not particularly restricted but include, among others, those used in cationic electrodeposition coating compositions in general, such as titanium dioxide, carbon black, iron oxide red and like color pigments; kaolin, clay, talc and like extenders. In cases where such a color pigment is used in the cationic electrodeposition coating composition of the present invention, the total amount of said color pigment and said rust inhibitor is preferably not more than 50% by weight relative to the solid resins in the cationic electrodeposition coating composition. As the method of mixing said color pigment with said resin composition, the same techniques as mentioned for incorporation of said rust inhibitor can be mentioned.

The cationic electrodeposition coating composition of the present invention can be prepared, for example by admixing the above resin composition with the ingredients mentioned above as necessary, followed by effecting dissolution or dispersion in water. When said composition is to be used for cationic electrodeposition coating, adjustment is preferably made so that a bath liquid with a nonvolatile matter content of 10 to 30% may be obtained. It is also preferred that the propargyl group, carbon-carbon double bond and sulfonium group contents are adjusted without departing from the respective ranges specified above in relation to the resin composition.

The cationic electrodeposition coating composition according to present invention is preferably adjusted so that the curing temperature therefor maybe within the range of 130° C. to 220° C. If the curing temperature is lower than 130° C., the smoothness of the multi-layer coating films obtained by subjecting a coating film obtained by using the cationic electrodeposition coating composition of the present invention to a further coating procedure may possibly be deteriorated. If the curing temperature is above 220° C., such multi-layer coating films may have poor film properties due to decreased curability or the multi-layer coating films resulting from further application of a top coating to said multi-layer coating films may have the problem of color difference.

The substrate to be coated, to be subjected to electrodeposition coating using the cationic electrodeposition coating composition of the present invention is not particularly restricted but may be any one having electroconductivity, for example, a panel, for example, iron, steel or aluminum, a surface-treated version thereof, or a molding thereof.

Said electrodeposition coating is carried out by immersing the substrate, which is to serve as a cathode, in a bath comprising the cationic electrodeposition coating composition and applying a voltage generally of 50 to 450 V between said cathode and an anode. If the voltage applied is lower than 50 V, the electrodeposition will be insufficient. If it exceeds 450 V, the power consumption will become uneconomically excessive. When the composition of the present invention is used and avoltage within the above range is applied, a uniform coating film can be formed all over the substrate without an abrupt increase in coating thickness in the process of electrodeposition. When the above voltage is applied, it is generally preferred that the cationic electrodeposition coating composition bath temperature is 10 to 45° C. The period for voltage application may be selected generally within the range of 2 to 4 minutes although it may vary depending on the electrodeposition conditions.

In the above electrodeposition coating process, a voltage can be further applied to the coating deposited upon application of a voltage between the substrate, which is the cathode, and the anode, to thereby increase the electric resistance per unit volume of said coating.

After completion of the electrodeposition process, the thus-obtained electrodeposited coating is cured, either as such or after washing with water, by baking at 120 to 260° C., preferably 160 to 220° C., for 10 to 30 minutes to complete the electrodeposition coating process. It is also possible to adopt the two-coat one-bake technique which comprises forming an uncured intermediate coating film on the electrodeposited coating obtained in the above manner by applying an intermediate coating, which is to be mentioned later herein, without curing said electrodeposited coating, in the so-called wet-on-wet manner, and heating both the uncured coating films simultaneously to give a multi-layer coating film.

It is preferred that the cured electrodeposited coating film formed by using the cationic electrodeposition coating composition of the present invention have a thickness of 10 to 25 $\mu$m. If it is less than 10 $\mu$m, the rust resistance will be insufficient. If it exceeds 25 $\mu$m, the extra amount of the coating may mean a waste of material.

The substrate having a cured coating film formed from the cationic electrodeposition coating composition of the present invention can further be provided with an intermediate coat and/or a top coat required for the intended use.

Thus, when the substrate is an automotive shell plate, for instance, an intermediate coating of the heat-curing type is generally used which comprises a binder and a curing agent and meets those performance characteristics requirements imposed on the intermediate coating for automobiles with respect to adhesiveness, smoothness, sharp reflectiveness, overbaking resistance and weathering resistance, among others. As said binder, there may be mentioned, among others, acrylic resins, polyester resins, alkyd resins and epoxy resins. Said curing agent may be selected from among a variety of species, such as amino resins, blocked isocyanate compounds, aliphatic polybasic carboxylic acids and anhydrides thereof, epoxy resins and so forth, according to the curing functional group(s) in said binder. The above intermediate coating may take various forms such as the solvent-based, water-based or water-dispersion type, or the powder form.

On the other hand, the top coating to be used is preferably generally used as a top coating for automobiles and capable of giving a top coat excellent in such properties as finished appearance (sharp reflectiveness, smoothness, gloss, etc.), weathering resistance (gloss retention, color retention, chalking resistance, etc.), chemical resistance, water resistance, moisture resistance and curability. As such, there may be mentioned solid color coatings used as one-coat solids as well as base coatings and clear coatings capable of being applied by the two-coat one-bake coating technique. These top coatings preferably are of the heat-curing type and contain a binder and a curing agent. Those binders and curing agents specifically mentioned hereinabove in relation to the intermediate coatings may be used also as said binder and curing agent in the top coatings. The above-mentioned solid color coatings contain one or more of inorganic or organic color pigments well known in the art, such as carbon black, phthalocyanine blue and titanium dioxide. Said base coatings may contain a well-known luster color pigment, such as flaky aluminum or flaky mica, in addition to the above-mentioned inorganic or organic color pigments. The clear coatings mentioned above, on the other hand, essentially contain no pigment. They may, however, contain such color pigments and/or luster color pigments in amounts not impairing the transparency thereof. These top coatings may be of the water-based, solvent-based or powder type. From the environmental protection viewpoint, however, they are preferably of the water-based or powder type. The water-based form can be obtained, for example by neutralizing the carboxyl groups of the binder with an amine to provide solubility in water, while the powder form can be obtained by adjusting the glass transition temperature to a level higher than room temperature.

The above intermediate coatings and top coatings may contain one or more of extenders, curing accelerators, leveling agents, ultraviolet absorbers, light stabilizers, and other additives. When the rust inhibitor to be contained in the cationic electrodeposition coating composition of the present invention is incorporated also in the intermediate coating in an amount of 2 to 30% by weight on the solid basis, the corrosion resistance and rust preventing property can further be improved.

Said intermediate coatings and said top coatings can be applied by a method well known in the art as selected depending on the form of the coating. Thus, for instance, spray coating, brushing, dipping or electrostatic coating can be employed. In the coating step in an automotive body production line, in particular, the electrostatic coating method is preferably employed. As regards the coating thicknesses of said intermediate coatings and said top coatings as well as the heating conditions to be employed after application, appropriate values and conditions can be selected according to the respective coating composition species.

Multi-layer coating films can be obtained by providing a coating obtained from the cationic electrodeposition coating composition of the present invention with an intermediate coat layer and a top coat layer.

Since the cationic electrodeposition coating composition of the present invention contains a rust inhibitor comprising at least one compound selected from the group consisting of compounds containing any of elemental metals belonging to the period 4, 5 or 6 of group 3 of the periodic table and a sulfonium- and propargyl group-containing resin composition and is excellent in resistance to corrosion and rusting, the coating film obtained therefrom is free from a toxic rust inhibitor such as lead compound and can minimize the environmental pollution.

As the reasons why high resistance to corrosion and rusting can be obtained without using any lead compound, there may be mentioned not only the addition of the rust inhibitor mentioned above but also the fact that the resin composition in the cationic electrodeposition coating composition of the present invention is by itself excellent in resistance to corrosion and rusting. The high resistance to corrosion and rusting of this resin composition is presumably ascribable to the excellent throwing power of said composition which allows a uniform film formation all over the substrate surface and/or to the sulfonium and propargyl groups in said resin composition which contribute to improved corrosion resistance and rust preventing property in some way or other.

Therefore, even when the substrate is thoroughly not subjected to a chemical conversion, the use of the cationic electrodeposition coating composition enables formation of a highly corrosion-resistant, rust-preventing coating film on the substrate surface.

In the cationic electrodeposition coating compositions of the present invention, a curing system based on addition polymerization, which is different from the conventional blocked isocyanate-based curing system, is employed, hence the curability is not so much influenced by the presence of a lead compound. Therefore, even when the system is deprived of the lead compound, it is not necessary to increase the amount of the metal catalyst.

EXAMPLES

The following examples illustrate the present invention in further detail. They are, however, by no means limitative of the scope of the present invention.

Production Example
Production of a Sulfonium- and Propargyl Group-containing Epoxy Resin Composition A separable flask equipped with a stirrer, thermometer, nitrogen inlet tube and reflux condenser was charged with 100.0 weight parts of Epo Tohto YDCN-701 (cresol novolak type epoxy resin; product of Tohto Kasei) with an epoxy equivalent of 200.4, 23.6 weight parts of propargyl alcohol and 0.3 weight part of dimethylbenzylamine, the temperature was raised to 105° C., and the reaction was allowed to proceed for 3 hours, to give a propargyl group-containing resin composition with an epoxy equivalent of 1580. To this was added 2.5 weight parts of copper acetylacetonate, and the reaction was allowed to proceed at 90° C. for 1.5 hours. Partial disappearance of the terminal hydrogen of the propargyl group as a result of addition was confirmed by proton (1H) NMR (the content of the acetylide-form propargyl corresponding to 14 millimoles per 100 grams of the solid resins). Thereto were added 10.6 weight parts of 1-(2-hydroxyethylthio)-2,3-propanediol, 4.7 weight parts of glacial acetic acid and 7.0 weight parts of deionized water, and the reaction was allowed to proceed while maintaining the temperature at 75° C. for 6 hours. Then, after confirming that the residual acid value was not more than 5, 43.8 weight parts of deionized water was added, to give a solution of the desired resin composition in solution form. This had a solid content of 70.0% by weight, a sulfonium value of 28.0 millimoles per 100 grams of the varnish. The number average molecular weight (GCP expressed in terms of polystyrene equivalent) was 2443.

Example 1
Cationic Electrodeposition Coating Composition 1

To 143 weight parts of the epoxy resin composition obtained in Production Example (solids concentration: 70 wt. %) were added 525.8 weight parts of deionized water and 1.2 weight parts of cerium acetate, and, after 1 hour of stirring using a high-speed rotary mixer, deionized water was further added to thereby adjust the solid concentration of the aqueous solution to 15% by weight. Thus was obtained a cationic electrodeposition coating composition 1 containing 0.5 weight part of cerium acetate in terms of the elemental metal based on 100 weight parts of the solid resins in the composition.

Example 2
Cationic Electrodeposition Coating Composition 2

Cationic electrodeposition coating composition 2 was prepared in the same manner as in Example 1 except that neodymium acetate in lieu of cerium acetate was used in a proportion of 0.5 weight part in terms of elemental neodymium per 100 weight parts of the solid resins in the composition.

Examples 3 to 9
Cationic Electrodeposition Coating Compositions 3 to 9

Except that europium acetate, holmium acetate, ytterbium acetate, yttrium acetate, yttrium amidosulfate, neodymium amidosulfate or samarium sulfate was used in lieu of cerium acetate and that each of these metal-containing organic or inorganic compounds was formulated in an amount of 0.5 weight part, in terms of elemental metal, based on 100 weight parts of the coating solids, the procedure of Example 1 was repeated to prepare cationic electrodeposition coating compositions 3 to 9, respectively.

Comparative Example 1
Cationic Electrodeposition Coating Composition 10

Except that the rust inhibitor was omitted from the formulation of Example 1, the procedure of Example 1 was repeated to give a rust inhibitor-free cationic electrodeposition coating composition 10.

Comparative Example 2
Cationic Electrodeposition Coating Composition 11

Except that lead acetate was used in lieu of cerium acetate and this lead acetate was formulated in an amount of 0.5 weight part, in terms of elemental metal, based on 100 weight parts of the coating solids, the procedure of Example 1 was repeated to give a cationic electrodeposition coating composition 11.

<Evaluation test>

The cationic electrodeposition coating compositions 1 to 11 obtained in Examples 1 to 9 and Comparative Examples 1 and 2 were each transferred to a stainless steel tank and used as an electrodeposition bath. A cold-rolled steel panel not provided with a chemical conversion film (degreased with Surf Cleaner, Nippon Paint) and a steel panel provided with a chemical conversion film (degreased with Surf Cleaner and treated with Nippon Paint's zinc phosphate-based treating agent Surfdyne SD-5000) were each immersed in said bath as the substrate-cathode, and electrodeposition coating was carried out to a dry film thickness of 15 $\mu$m. The coated panel was then taken out of the electrodeposition bath, washed with water and heated in a drying oven maintained at 180° C. for 30 minutes to give a cationically electrodeposited coating film.

Smoothness of Film

The appearance of the coated surface of each product steel panel was macroscopically evaluated. The evaluation criteria used are as follows. The results are shown in Table 1.

○: Good

Δ: Slightly poor

X: Poor

Rust Preventing Property

On the coated side of each test steel panel, a cross-cut reaching the base metal was made with a cutter knife and a salt spray test (5 wt. % NaCl/$H_2O$, 35° C.) was performed for 240 hours for the steel panel not provided with a chemical film or 480 hours for the steel panel provided with a chemical film. The blistering of the coated surface as a whole was macroscopically evaluated. In addition, the coat around the cut was peeled off with an adhesive tape and the maximum peel distance from the cut was measured and evaluated. The evaluation criteria used are shown below. The results are shown in Table 1.

Blister

○: Minimal

Δ: Slight

X: Severe

Peel

○: <2 mm

Δ: ≧2 mm, <4 mm

X: ≧4 mm

Corrosion Resistance

On the coated side of each test steel panel, a cross-cut reaching the base metal was made with a cutter knife and a salt immersion test (5 wt. % NaCl/$H_2O$, 55° C.) was performed for 120 hours for the steel panel not provided with a chemical film or 240 hours for the steel panel provided with a chemical film. The blistering of the coated surface as a whole was macroscopically evaluated. In addition, the coat around the cut was peeled off with an adhesive tape and the maximum peel distance from the cut was measured and evaluated. The evaluation criteria used are shown below. The results are shown in Table 1.

Blister
- ○: Minimal
- Δ: Slight
- X: Severe

Peel
- ○: <2 mm
- Δ: ≧2 mm, <4 mm
- X: ≧4 mm

Environmental Compatibility

It was investigated whether the test panels contains harmful metals.
- ○: No harmful metal
- X: Some harmful metal

TABLE 1

|  |  | Example |  |  |  |  |  |  |  |  | Compar. Ex. |  |
|---|---|---|---|---|---|---|---|---|---|---|---|---|
|  |  | 1 | 2 | 3 | 4 | 5 | 6 | 7 | 8 | 9 | 1 | 2 |
| Untreated steel panel | Smoothness of film | ○ | ○ | ○ | ○ | ○ | ○ | ○ | ○ | ○ | ○ | X |
|  | Corrosion resistance Blister | ○ | ○ | ○ | ○ | ○ | ○ | ○ | ○ | ○ | Δ | ○ |
|  | Corrosion resistance Peeling | ○ | ○ | ○ | ○ | ○ | ○ | ○ | ○ | ○ | Δ | ○ |
|  | Rust-preventing property Blister | ○ | ○ | ○ | ○ | ○ | ○ | ○ | ○ | ○ | X | ○ |
|  | Rust-preventing property Peeling | ○ | ○ | ○ | ○ | ○ | ○ | ○ | ○ | ○ | Δ | ○ |
| Steel panel subjected to chemical conversion | Smoothness of film | ○ | ○ | ○ | ○ | ○ | ○ | ○ | ○ | ○ | ○ | X |
|  | Corrosion resistance Blister | ○ | ○ | ○ | ○ | ○ | ○ | ○ | ○ | ○ | ○ | ○ |
|  | Corrosion resistance Peeling | ○ | ○ | ○ | ○ | ○ | ○ | ○ | ○ | ○ | ○ | ○ |
|  | Rust-preventing property Blister | ○ | ○ | ○ | ○ | ○ | ○ | ○ | ○ | ○ | ○ | ○ |
|  | Rust-preventing property Peeling | ○ | ○ | ○ | ○ | ○ | ○ | ○ | ○ | ○ | ○ | ○ |
| Environmental compatibility |  | ○ | ○ | ○ | ○ | ○ | ○ | ○ | ○ | ○ | ○ | X |

It can be seen that the cationic coating film obtained from a cationic electrodeposition coating composition comprising at least one rust inhibitor compound selected from the group of compounds containing any of metal elements belonging to the period 4, 5 or 6 of group 3 of the periodic table and a sulfonium- and propargyl group-containing resin composition is not only excellent in corrosion resistance and rust preventing property but also has a good appearance.

What is claimed is:

1. A cationic electrodeposition coating composition which comprises a rust inhibitor comprising at least one compound selected from the group consisting of compounds containing any of elemental metals belonging to the period 4, 5 or 6 of group 3 of the periodic table and a sulfonium- and propargyl group-containing resin composition.

2. The cationic electrodeposition coating composition according to claim 1,
wherein the content of said rust inhibitor is 0.03 to 10 weight parts in terms of said elemental metal in the rust inhibitor based on 100 weight parts of the solid resins in said resin composition.

3. The cationic electrodeposition coating composition according to claim 1,
wherein said resin composition has a sulfonium group content of 5 to 400 millimoles and a propargyl group content of 10 to 495 millimoles per 100 grams of the solid resins in said resin composition, and
the sum total of the sulfonium and propargyl group contents is not more than 500 millimoles per 100 grams of the solid resins in said resin composition.

4. The cationic electrodeposition coating composition according to claim 1,
wherein said resin composition has a sulfonium group content of 5 to 250 millimoles and a propargyl group content of 20 to 395 millimoles per 100 grams of the solid resins in said resin composition, and
the sum total of the sulfonium and propargyl group contents is not more than 400 millimoles per 100 grams of said solid resins in said resin composition.

5. The cationic electrodeposition coating composition according to claim 1,
wherein said resin composition comprises an epoxy resin as a skeleton thereof.

6. The cationic electrodeposition coating composition according to claim 5,
wherein said epoxy resin is a novolak cresol type epoxy resin or novolak phenol type epoxy resin
and has a number average molecular weight of 700 to 5,000.

7. The cationic electrodeposition coating composition according to claim 2,
wherein said resin composition has a sulfonium group content of 5 to 400 millimoles and a propargyl group content of 10 to 495 millimoles per 100 grams of the solid resins in said resin composition, and
the sum total of the sulfonium and propargyl group contents is not more than 500 millimoles per 100 grams of the solid resins in said resin composition.

8. The cationic electrodeposition coating composition according to claim 2,
wherein said resin composition has a sulfonium group content of 5 to 250 millimoles and a propargyl group content of 20 to 395 millimoles per 100 grams of the solid resins in said resin composition, and
the sum total of the sulfonium and propargyl group contents is not more than 400 millimoles per 100 grams of said solid resins in said resin composition.

9. The cationic electrodeposition coating composition according to claim 3, wherein said resin composition has a sulfonium group content of 5 to 250 millimoles and a propargyl group content of 20 to 395 millimoles per 100 grams of the solid resins in said resin composition, and the sum total of the sulfonium and propargyl group contents is not more than 400 millimoles per 100 grams of said solid resins in said resin composition.

10. The cationic electrodeposition coating composition according to claim 2, wherein said resin composition comprises an epoxy resin as a skeleton thereof.

11. The cationic electrodeposition coating composition according to claim 3, wherein said resin composition comprises an epoxy resin as a skeleton thereof.

12. The cationic electrodeposition coating composition according to claim 4, wherein said resin composition comprises an epoxy resin as a skeleton thereof.

* * * * *